United States Patent
Compton (10) Patent No.: US 7,996,567 B2
(45) Date of Patent: Aug. 9, 2011

(54) AUDIO PROCESSING

(75) Inventor: Matthew Compton, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 1253 days.

(21) Appl. No.: 10/550,928

(22) PCT Filed: Mar. 31, 2004

(86) PCT No.: PCT/GB2004/001349
§ 371 (c)(1),
(2), (4) Date: Sep. 28, 2005

(87) PCT Pub. No.: WO2004/088926
PCT Pub. Date: Oct. 14, 2004

(65) Prior Publication Data
US 2006/0192892 A1 Aug. 31, 2006

(30) Foreign Application Priority Data
Mar. 31, 2003 (GB) .................... 0307431.7

(51) Int. Cl.
*G06F 15/173* (2006.01)
*G06F 15/16* (2006.01)
*H04J 3/16* (2006.01)
*H04J 3/12* (2006.01)
*H04J 3/04* (2006.01)

(52) U.S. Cl. ........ 709/250; 709/223; 370/469; 370/522; 370/530

(58) Field of Classification Search .................. 709/223, 709/250; 370/469, 522, 535
See application file for complete search history.

(56) References Cited

U.S. PATENT DOCUMENTS

| | | | |
|---|---|---|---|
| 5,055,927 A | 10/1991 | Keesen et al. | |
| 5,712,920 A | 1/1998 | Spille | |
| 6,046,724 A | 4/2000 | Hvass | |
| 6,211,869 B1 | 4/2001 | Loveman et al. | |
| 6,414,960 B1 * | 7/2002 | Kuhn et al. | 370/395.64 |
| 6,446,037 B1 * | 9/2002 | Fielder et al. | 704/229 |
| 6,466,832 B1 * | 10/2002 | Zuqert et al. | 700/94 |

(Continued)

FOREIGN PATENT DOCUMENTS
EP  0 540 330  5/1993
(Continued)

OTHER PUBLICATIONS
1, RTP Payload Format for BT.656 Video Encoding, D. Tynan, (Claddagh Films) RFC2431, Oct. 1998.

*Primary Examiner* — Phuoc Nguyen
*Assistant Examiner* — Clarence John
(74) *Attorney, Agent, or Firm* — Oblon, Spivak, McClelland, Maier & Neustadt, L.L.P.

(57) ABSTRACT

A network interface device connectable to a network, the device being arranged to receive digital audio data representing an audio signal and, substantially in real time, to launch data packets representing the digital audio data onto the network, the device comprising: an attribute detector arranged to generate attribute data representing an attribute of the audio signal; and a packetiser operable: to format the digital audio data into audio data packets to be launched onto the network; and to format the attribute data into attribute data packets, separate from the audio data packets, to be launched onto the network.

16 Claims, 7 Drawing Sheets

U.S. PATENT DOCUMENTS 6,529,506 B1 * 3/2003 Yamamoto et al. ........... 370/389
2002/0191116 A1 12/2002 Kessler et al.

FOREIGN PATENT DOCUMENTS

| | | |
|---|---|---|
| EP | 0 598 392 | 5/1994 |
| EP | 0 618 693 A1 | 10/1994 |
| EP | 0 800 287 A2 | 10/1997 |
| EP | 1 146 672 A1 | 10/2001 |
| EP | 1 204 277 | 5/2002 |
| JP | 2000-182324 | 6/2000 |
| WO | WO 97/13337 | 4/1997 |
| WO | WO 01/74078 | 10/2001 |

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|    PT     |       sequence number          |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|F|V| Type  |P| Z |    Scan Line (SL)    |   Scan Offset(SO)   |
+-+-+-+-+-+-+-+-+-+-+-+-+-+-+-+-+-+-+-+-+-+-+-+-+-+-+-+-+-+-+-+-+
|                                                               |
:                      AES Audio Payload                        :
|                                                               |
+---------------------------------------------------------------+
```

Fig. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+   -
|     DID       | Payload Size  |           RSVD                |   |
+-+-+-+-+-+-+-+-+-+-+-+-+-+-+-+-+-+-+-+-+-+-+-+-+-+-+-+-+-+-+-+-+   |
|    Channel Pair 1 Run Count   |   Channel Pair 2 Run Count    |   |
+-+-+-+-+-+-+-+-+-+-+-+-+-+-+-+-+-+-+-+-+-+-+-+-+-+-+-+-+-+-+-+-+  Sub-
|       AES Audio Group Samples or Ctrl Packet Words            | Packet
:                                                               :   |
|                                                               |   |
+---------------------------------------------------------------+   -
|     DID       | Payload Size  |           RSVD                |
+-+-+-+-+-+-+-+-+-+-+-+-+-+-+-+-+-+-+-+-+-+-+-+-+-+-+-+-+-+-+-+-+
|    Channel Pair 1 Run Count   |   Channel Pair 2 Run Count    |
+-+-+-+-+-+-+-+-+-+-+-+-+-+-+-+-+-+-+-+-+-+-+-+-+-+-+-+-+-+-+-+-+
|       AES Audio Group Samples or Ctrl Packet Words            |
:                                                               :
|                                                               |
+-+-+-+-+-+-+-+-+-+-+-+-+-+-+-+-+-+-+-+-+-+-+-+-+-+-+-+-+-+-+-+-+
|   DID == 0    |              RSVD                             |
+---------------------------------------------------------------+
```

Fig. 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         24 bit PCM Audio Sample              |CH |Z|V|U|C| - |
+-+-+-+-+-+-+-+-+-+-+-+-+-+-+-+-+-+-+-+-+-+-+-+-+-+-+-+-+-+-+-+-+
```

Fig. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      AF1-2     |      AF3-4     |      RATE      |    -       |
+-+-+-+-+-+-+-+-+-+-+-+-+-+-+-+-+-+-+-+-+-+-+-+-+-+-+-+-+-+-+-+-+
|       ACT      |      DELA0     |      DELA1     |    -       |
+-+-+-+-+-+-+-+-+-+-+-+-+-+-+-+-+-+-+-+-+-+-+-+-+-+-+-+-+-+-+-+-+
|      DELA2     |      DELB0     |      DELB1     |    -       |
+-+-+-+-+-+-+-+-+-+-+-+-+-+-+-+-+-+-+-+-+-+-+-+-+-+-+-+-+-+-+-+-+
|      DELB2     |      DELC0     |      DELC1     |    -       |
+-+-+-+-+-+-+-+-+-+-+-+-+-+-+-+-+-+-+-+-+-+-+-+-+-+-+-+-+-+-+-+-+
|      DELC2     |      DELD0     |      DELD1     |    -       |
+-+-+-+-+-+-+-+-+-+-+-+-+-+-+-+-+-+-+-+-+-+-+-+-+-+-+-+-+-+-+-+-+
|      DELD2     |      RSVD1     |      RSVD2     |    -       |
+-+-+-+-+-+-+-+-+-+-+-+-+-+-+-+-+-+-+-+-+-+-+-+-+-+-+-+-+-+-+-+-+
```

AUDIO PROCESSING

The present invention relates to processing audio data.

It is known to link video and audio devices in a television studio together using a switching device, typically a cross point switch.

A system which links audio and video devices in a studio by a switched local area network, for example an Ethernet network, operating with a known protocol such as Internet Protocol (IP) has been proposed in the copending UK application 0307426.7

The audio and video devices used in a studio include cameras, editors, audio mixers, video tape recorders (VTRs) and play-out switches amongst other examples. It is also known to use monitors to view video which is being played out or to preview on monitors video which is available to be played out.

Similarly, an operator may listen to audio material which is to be played out. A difference here, however, is that while an operator can usefully watch several video monitors at the same time, either on different screens or as a tiled display on a single screen, the operator cannot usefully listen to several audio streams at once. To do so would require a very large network bandwidth to be handled by a network node associated with that operator, and the resulting mix of sounds would probably be unintelligible. So, in practical terms, the operator has to switch from one to another audio stream in order to monitor the content of the streams.

This invention provides a network interface device connectable to a network, the device being arranged to receive digital audio data representing an audio signal and, substantially in real time, to launch data packets representing the digital audio data onto the network, the device comprising:

an attribute detector arranged to generate attribute data representing an attribute of the audio signal; and a packetiser operable:
to format the digital audio data into audio data packets to be launched onto the network; and
to format the attribute data into attribute data packets, separate from the audio data packets, to be launched onto the network.

This invention also provides a network destination device connectable to a network, the device being operable to receive audio data packets representing an audio signal and being operable to receive attribute data packets carrying attribute data representing an attribute of the audio signal; the device comprising a user interface arranged to provide a user indication representing a current value of the attribute data.

The invention recognises that an operator may wish to monitor several audio streams at once, but in (for example) a broadcast situation this might only be to make sure that some audio is being carried by each stream.

The invention provides an arrangement for generating, at a network source, attribute data indicative of an attribute (e.g. a level) of an audio signal. The attribute data is launched onto the network in packets which are separate from packets carrying the audio data. So, a network receiver can selectively receive only the packets carrying attribute data.

At the receiver, an indication, such as a visual indication, is preferably given to an operator to show the current state of the attribute data.

This arrangement provides several advantages: it enables the user to monitor the presence (and an attribute) of audio data on several channels simultaneously, and it allows this function to be achieved without that user having to receive full bandwidth audio data form each source being monitored. This latter point can dramatically reduce network traffic in, for example, a broadcast network.

Further respective aspects and features of the present invention are defined in the appended claims.

Embodiments of the invention will now be described, by way of example only, with reference to the accompanying drawings in which.

Figure 1:
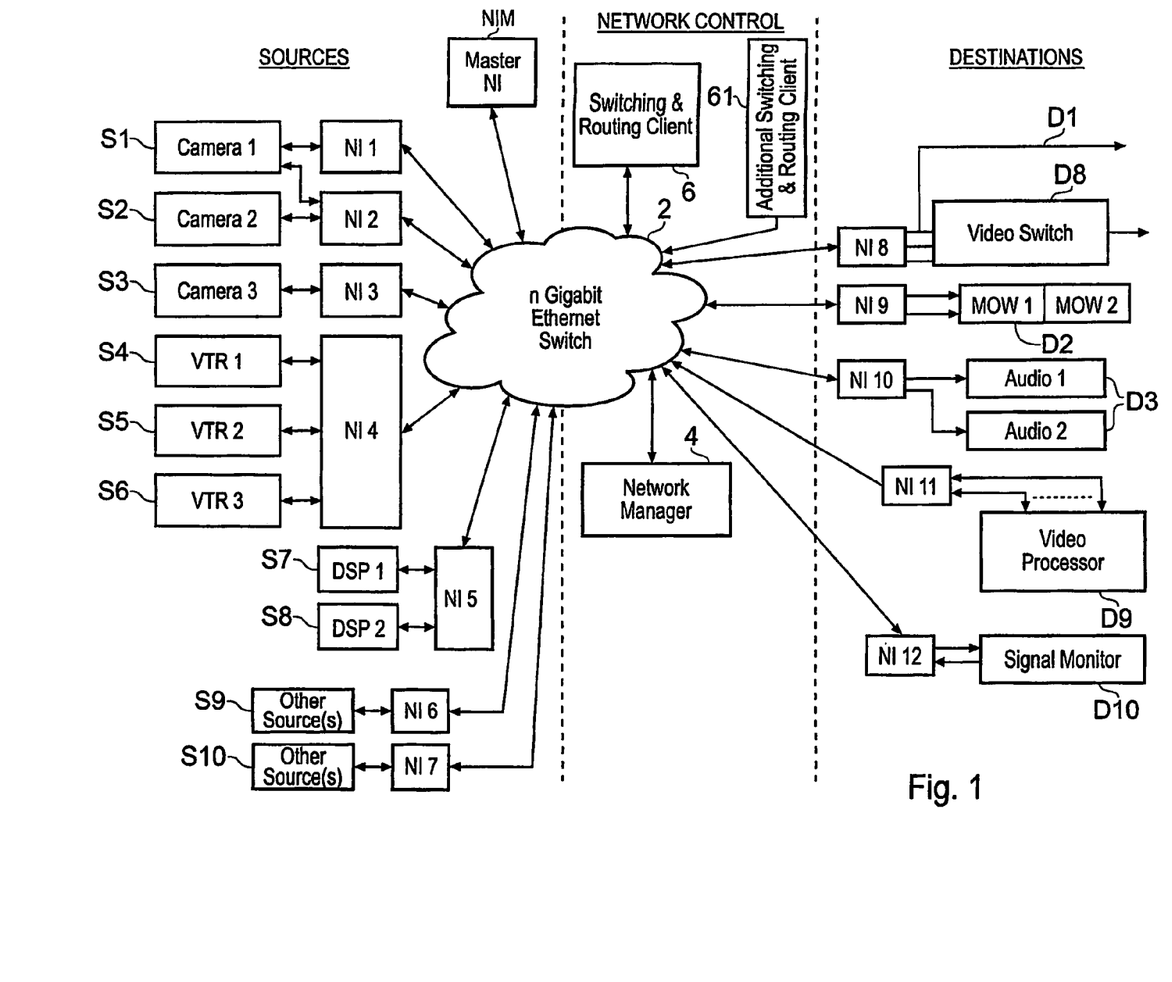
FIG. 1 is a schematic block diagram of a network in a studio.

Referring to FIG. 1, a network is installed in for example a studio. The network comprises a plurality of source group AV devices consisting of three cameras S1 to S3, three video tape recorders (VT10s) S4 to S6, two digital signal processors (DSPs) S7, S8 and two other source groups S9, S10 which generate serial digital audio data only. The network further comprises a set of destination group AV devices consisting of a video switch D8, a pair of monitors D2, a pair of audio processors D3, a video processor D9 and a signal monitor D10.

An Ethernet switch 2 effects connections between source group devices and destination group devices. All of the group devices S1 to S10 and D1, D2, D3, D8, D9, D10 are connected to the network via at least one Enhanced Network Interface Card (ENIC) NI1 to NI12, which differs from a standard network interface card and whose structure and function is described in more detail below.

The network further comprises a network control arrangement consisting of a first switching and routing client 6, an additional switching and routing client 61 and a network manager 4. A user may request a change in the current configuration of the virtual circuit-switched connections of the network via a Graphical User Interface (GUI) generated by a computer software application, which in this arrangement is displayed on a monitor associated with the switching and routing client 6. However, in alternative arrangements the GUI is displayed on a monitor associated with the network manager 4.

The network is an Ethernet multicast network comprising the Ethernet switch 2, which is an asynchronous nGigabit Ethernet switch 2, where n is 1 or 10 for example. Connected to the Ethernet switch 2 are network nodes comprising the source "groups" S1 to S10, the destination "groups" D1, D2, D3, D8 D9 and D10, and the network control arrangement, which in this example comprises the network manager 4 and the switching and routing clients 6, 61.

A source group is defined to be an AV device such as a camera S1 or a video tape recorder (VTR) 54 that is operable to generate or supply audio and/or video data for transmission across the network, the source group having one or more input and/or one or more output terminal. Each input/output terminal of the AV device will be connected to a port of one of the ENICs NI1 to NI12. However, different terminals of the same AV device may be connected to different ENICs as in the case of source group S1 in FIG. 1, which has a first output terminal connected to ENIC NI1 and a second output terminal connected to ENIC NI2. A destination group is defined to be an AV device such as a video switch D8, video processor D9 or audio processor D3, that is operable to receive packetised audio and/or video data via the network and to perform processing operations on the received data. Similarly to the source group, the destination group comprises one or more inputs and/or one or more outputs which can be connected to different ports of the same ENIC or to different ENICs.

It will be appreciated that a destination group may also act as a source and a source group may also act as a destination for different data exchange events on the network. For example the VTR S4 has audio, video, status and proxy source and/or destination devices associated with it and for a data exchange event involving output of data across the network from a video source device on the VTR 54 to the video processor D9, the VTR 54 acts as a source group. A different data exchange event may involve the VTR 54 receiving data from a camera S1 that has been routed via the network through the video processor D9 for subsequent recording by the VTR 54, in which case, the processed video data will be received from the network at a destination device (ENIC input terminal) associated with the VTR 54 for subsequent supply to the VTR 54 in serial digital form for recording so that the VTR 54 acts as a destination group in this context.

Whilst the AV devices themselves are denoted source groups S1 to S10 and destination groups D1, D2, D3, D8, D9, D10 each of these groups is connected to one or more ENIC ports. The ENIC ports will be denoted "source devices" and "destination devices". A "source device" is defined to be an ENIC output port, which outputs packetised data onto the network or outputs serial digital data to a destination group AV device whereas a "destination device" is defined to be an ENIC input port, which receives either packetised data from the network or serial digital data from a source group AV device output terminal. The source devices and destination devices of an ENIC can be associated with the source groups (AV devices) from which they receive data for transmission across the network or the destination groups to which they deliver data from the network. The network manager 4 keeps track of the mappings between ENIC ports and AV devices.

To enable connection to the network, each source group S1-S6 and each destination group D1, D2, D3, D8, D9, D10 is coupled to the Ethernet switch 2 by at least one network interface card NI 1 to 12. These network interface cards are specially adapted for transmission of audio and/or video data across the network according to the present technique and are denoted ENICs (Enhanced Network Interface Cards). A single source or destination group may be connected to a plurality of ENICs, for example, in the arrangement of FIG. 1, the camera source group S1 is connected to two different ENICs, that is, NI1 and NI2. In particular, one subset of source devices (output terminals) and destination devices (input terminals) of the source group are connected to the first ENIC NI1 whereas another different subset is connected to the second ENIC NI2. Each ENIC NI1 to NI12 can have a plurality of ports. Input ports of a first subset of the ENICs, NI1 to NI7 receive data directly from source groups such as cameras SI1 to SI3, VTRs S4 to S6 and DSPs SI7, SI8 and the output ports of those ENICs transmit packetised data across the network, whereas input ports of a second subset of the ENICs, NI8 to NI12, receive packetised data derived from other source groups across the network whilst their output ports supply serial digital audio and/or video data to destination groups such as the video switch D8 and audio processors D3.

In a conventional studio, the source groups, e.g. cameras and destination groups e.g. video processors are connected by a cross point switch. The conventional cross point switch requires specific known devices to be connected to corresponding specific known ports on the switch to ensure that they can be connected together via switch. By way of contrast, the network of FIG. 1, including the Ethernet switch 2, is configured by the network manager 4 and by the switching and routing client 6 to provide virtual circuit-switched connections that emulate a crosspoint switch at least to the extent that any one or more source groups can be connected to any one or more destination groups. The virtual circuit-switched connections are facilitated by implementation, in the arrangement of FIG. 1, of an Internet Protocol (IP) multicast network that uses a known protocol, IGMP (Internet Group Management Protocol). The multicast network enables transmission of data from one source device to several destination devices belonging to a predetermined multicast group across the network and IGMP provides a means of identifying which multicast group a source device or destination device belongs to. Each source device and destination device is assigned an identifier and predetermined source device identifiers and destination device identifiers are associated with a given multicast address in order to define the virtual connections. Unlike the conventional cross point switch network, in the network of FIG. 1 the actual physical ports of the Ethernet switch 2 to which the source devices and destination devices are connected are irrelevant because the connections are flexibly specified using the identifiers and multicast addresses and associated communication protocols.

It should be noted that in the example arrangement of FIG. 1 the network operates as follows: a single source device should belong to only one multicast group that is not shared by any other sources. At least one destination device receives data from that source device by joining the source device's multicast group. A given destination device joins a multicast group in order to receive data from the associated source device by issuing a multicast group join message. The network control arrangement 4, 6, 61 initiates each virtual circuit-switched connection by sending a control message to the destination device (i.e. to an input terminal of one of destination group AV devices or a corresponding ENIC terminal) instructing the device to issue a request to the Ethernet switch 2 to join the multicast group of the appropriate source device. Multiple destination devices can join a given multicast group and the Ethernet switch 2 performs the required duplication of the data from the source device transmitting to that multicast group. The data that may be transmitted by a source device to the plurality of destination devices of the multicast group includes video data, audio data, timecode data or status data.

An ENIC allows any source group, for example a camera, and any destination group, for example a VTR, which is not designed for use with a multicast network to be used in a multicast network. An ENIC is a "dumb" device which can be requested to supply and receive audio, video, and control data streams. An ENIC cannot view or initiate any change to the configuration of the network. Rather, the network manager 4 controls to which multicast group(s) a given ENIC may subscribe and directs the ENIC to issue requests to the Ethernet switch 2 to join those multicast groups. Although, in the arrangement of FIG. 1, The ENICs NI1 to NI12 are distinct entities from the source group and destination group AV devices with which they are associated, it will be appreciated that in alternative arrangements the functionality of an ENIC could be integrated into an AV device.

Each ENIC has an associated Ethernet address and an IP address. The Ethernet address is a 48-bit value that specifies a physical address within the LAN whereas the IP address is (in for example IPv4) a 32-bit value that identifies each sender or receiver of packet-based information across the Internet. The Ethernet address typically differs from the IP address but the two addresses can be mapped to each other e.g. using Address Resolution Protocol (ARP). The IP address is required to enable the Ethernet switch 2 to route data to and from the ENIC. Each data stream associated with the ENIC is identified using both a multicast address and a User Datagram Protocol (IDP) port number. UDP is a transport layer protocol that together with IP mediates data communication across the network. UDP provides port numbers to distinguish different transaction requests (this service is not provided by IP). In this embodiment a single IP address is associated with each ENIC. However, in alternative embodiments multiple IP addresses could be associated with a single ENIC. Besides the Ethernet address and IP address, the ENIC also has an associated ENIC identifier (ID) and a plurality of port IDs for respective ones of the destination devices and source devices associated with the ENIC. All of the addresses and IDs associated with each ENIC are recorded by the network manager 4. The source devices and destination devices (i.e. individual inputs and outputs of the network node devices S1-S8 and D1, D2, D3, D8, D9, D10) correspond to respective ones of one or more physical inputs and outputs of an ENIC. An ENIC acts as a switch which switches data received from the switch 2 to a specified physical output of the ENIC and switches data from a specified physical input to the switch 2.

The network, implemented using the Ethernet switch 2, is asynchronous. However video and audio data need synchronous processing. The ENICs provide synchronous operation across the network and align frames of different video streams for purposes such as editing. The video and audio devices (i.e. source groups and destination groups) connected to the network operate on serial digital data, for example using the digital standard Serial Digital Interface (SDI) for interface of component digital video or the Audio Engineering Society (AES) digital audio standard for audio data. The ENICs convert data from the source device at the transmission end from SDI or AES serial digital format to a packetised format suitable for transmission across the network, in particular to multicast UDP/IP data packets. At the receiving end, the ENICs convert multicast UDP/IP data packets received from the network to a serial digital data format suitable for delivery to the destination device.

A further functionality provided by the ENICs is a so-called "proxy" operation. The ENIC generates from a full resolution video stream a reduced resolution video stream denoted "proxy video". The proxy video is a reduced-bandwidth version of the corresponding full-resolution video information and, as such, is suitable for processing by network clients having restricted storage capacity and/or processing power or for use in previewing information content for downloading across the network. Also, the ENIC generates so-called "proxy audio". Although this could be a reduced bit rate version of an audio signal, in the present embodiments the term is used to refer to data which represents an attribute of the audio signal, such as a level of the audio signal. Proxy audio generation will be described in more detail below.

In the case that a source or destination is a networked video server or client in which video data is stored on (for example) a hard disk drive, the ENIC associated with that source/destination can act as an interface between data stored at the server in the form of video frames and the packetised format in which the data is transmitted over the network. So, for an outgoing field or frame read from a local hard disk, the ENIC would carry out the conversion into packetised form. For an incoming field or frame, the ENIC would carry out the conversion from packetised form into a field or frame ready to be stored on the hard disk.

But apart from the video functionality, the ENIC can also operate as a conventional network interface card. So, ancillary asynchronous data such as email traffic can be handled as well as the synchronous audio and video traffic. Generally, the ENIC is arranged so as to give priority to the synchronous traffic, but this would still normally leave gaps between the audio and video packets for asynchronous packets to be handled.

The network manager 4 co-operates with the switching and routing clients 6, 61 to form the network control arrangement that is operable to assign multicast group identifiers to the audio and video source devices and to instruct destination devices to issue requests to the Ethernet switch 2 to join a particular multicast group in order to receive data from the corresponding source device. The network manager 4 maintains information of the current state of the network and all instructions that initiate a change to the device configuration or to the network connectivity originate from the network manager 4. In the arrangement of FIG. 1, the network manager is a Personal Computer (PC) that is linked to the network via a standard network interface card. In alternative arrangements the network manager could be for example a workstation and the network control arrangement may comprise more than one network manager.

The network manager 4 maintains a database specifying the configuration of the network. In the arrangement of FIG. 1, the database is stored on the same PC as the network manager 4 but in alternative arrangements it could be stored on at least one different PC. The database records, for each ENIC, the associated Ethernet address, the IP address, the ENIC ID and the source devices and destination devices (inputs and outputs of the network node devices) currently connected to the network via that ENIC.

The network manager 4 also performs the functions of: allocating network resources to the switching and routing client(s) 6, 61 and to the ENICs NI1 to NI12; sending commands to the destination devices to issue requests to the Ethernet switch 2 to join a specified multicast group thereby changing the audio and/or video virtual circuit-switched connections across the network; and ensuring that each switching and routing client's 6, 61 view of the network is correct.

For sending streams of audio and video data from the source devices to the destination devices, the transport layer is UDP multicast. The audio and video data are carried in Real-Time Protocol (RTP) format (e.g. a so-called BT.656 format—see reference 1) within a UDP packet. This applies to the audio data, the full resolution video and the low resolution proxy video.

RTP provides functions to support real-time traffic, that is, traffic that requires time-sensitive reproduction at the destination application. The services provided by RTP include payload type identification (e.g. video traffic), sequence numbering, time-stamping and delivery monitoring. RTP supports data transfer to multiple destinations via multicast distribution if provided by the underlying network. The RTP sequence numbers allow the receiver to reconstruct the original packet sequence. The sequence numbers may also be used to determine the proper location of a packet. RTP does not provide any mechanism to ensure timely delivery, nor does it provide other Quality of Service guarantees.

When an ENIC receives an AVSCP switch request from the network manager 4, the ENIC sends an IGMP join message to the Ethernet switch 2 to join the multicast group of the data it needs to receive.

Figure 2:
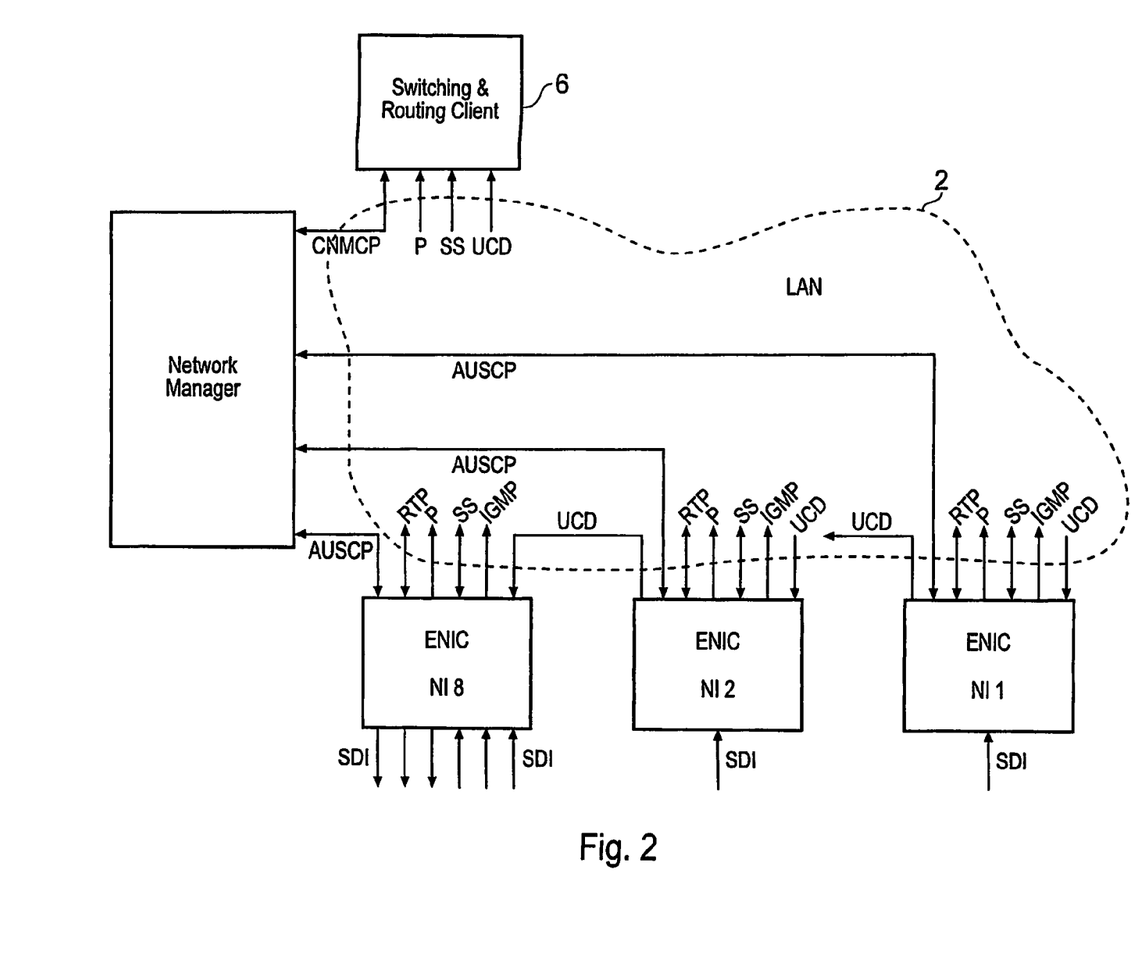
FIG. 2 is a schematic simplified diagram of the network showing data flows across the network.

AV proxy streams are communicated across the network using RTP over UDP multicast. The switching and routing client 6 can elect to receive proxy video for monitoring purposes and to make informed switching decisions with regard to the virtual circuit-switched connections. In the arrangement of FIG. 2 only the switching and routing client 6 receives the proxy video stream but ENICs NI1 (associated with 'Camera 1' S1 source group), NI2 (associated with 'Camera 2' S2 source group) and NI8 (associated with video switch D8 destination group) are all operable to output proxy video data streams. Users of source group and destination group devices such as cameras, VTRs and video processors are likely to want to make editing decisions based on the content of the audio and/or video data streams and it is for this reason that AV proxy streams are generated. Although several known video formats stream video data across a network using RTP, these known methods involve heavy compression of the video data. Video compression methods that introduce significant periods (i.e. >one field) of delay are unsuitable for the studio production environment in which the network according to the present technique is likely to be deployed. Furthermore, in a production environment it is likely that multiple AV data sources will have to be displayed substantially simultaneously on a screen and this would place undue burden on the data processor to decompress the multiple data streams, perhaps requiring hardware acceleration. Accordingly, the video proxy is generated as an uncompressed sub-sampled data stream rather than a compressed data stream (e.g. QCIF (176 or 180 samples×144 lines); 16 bit RGB; 25 frames per second; sub-sampling with horizontal and vertical filtering; at 15.2 Mbits per second from a 625 lines×1440 samples per line source; or (180 samples×120 lines) from a 525 lines by 1440 samples source).

Figure 3:
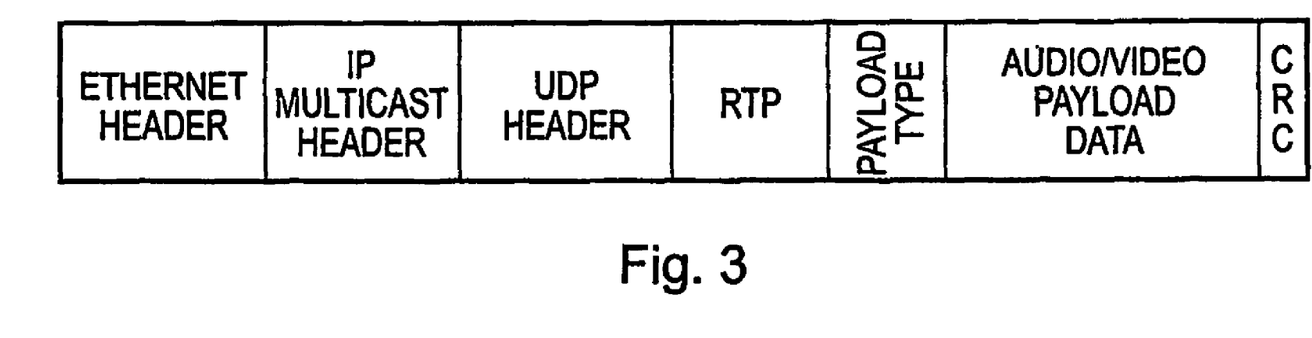
FIG. 3 is a schematic diagram of the format of an audio or video packet used in the network.

Referring to FIG. 3, the audio and video data format comprises, in order, an Ethernet header, an IP multicast header, a UDP header, an RTP header, a field specifying the type of payload, the payload, and a CRC (cyclic redundancy check) field. The Ethernet header comprises a source Ethernet address and a destination multicast Ethernet address. The IP multicast header comprises the source ENIC IP address and the destination device multicast IP address. There are several different IP address classes e.g. Class A has the first 8-bits allocated to the network ID and the remaining 24-bits to the host ID whereas Class B has the first 16 bits allocated to the network ID and the remaining 16-bits to the host ID. Class D IP addresses are used for multicasting. The four left-most bits of a Class D network address always start with the binary pattern 1110, corresponding to decimal numbers 224 to 239, and the remaining 28 bits are allocated to a multicast group ID. IGMP is used in conjunction with multicasting and Class D IP addresses.

The set of hosts (i.e. source and/or destination devices) listening to a particular IP multicast address is called a host group. A host group may span multiple networks and membership of a host group is dynamic. The Class D IP address is mapped to the Ethernet address such that the low-order 23 bits (of 28) of the multicast group ID are copied to the low-order 23 bits of the Ethernet address. Accordingly 5 bits of the multicast group ID are not used to form the Ethernet address. As a consequence the mapping between the IP multicast address and the Ethernet address is non-unique i.e. 32 different multicast group IDs map to the same Ethernet address.

The UDP header comprises source and destination port numbers, which are typically associated with a particular application on a destination device. Note that UDP is redundant in the case of multicast messages since in this case the multicast group address identifies the stream/content. The audio/video streams are transported using RTP protocol. Forward Error Correction (FEC) may be used for certain data streams e.g. full resolution video streams to provide a level of protection against data corruption due to network errors. FEC is provided using a known RTP payload format that provides for FEC. FEC is a parity-based error protection scheme.

A known extension to the RTP protocol allows a video scan line number to be specified in the RTP payload header. The RTP header also comprises a field to specify whether 8-bit or 10-bit video is present. Although known RTP and RTP/FEC protocol formats provide the data packet fields necessary to transport audio and video data over an IP network it may also be desired to transmit additional information such as source status and source timecode information. For example if the source device is a VTR then the timecode as stored on the tape should be transferred across the network. The source status information might indicate, for example, whether the VTR is currently playing, stopped or in jog/shuttle mode. This status information allows a user to operate the VTR from a remote network location. Since the timecode data and source status information is required only once per field, the information is transported in an RTP packet marked as vertical blanking. To allow audio and video resynchronisation, the RTP timecode is based on a 27 MHz clock. The payload type field contains data indicating the type of payload. i.e. video or audio data. The payload field contains the video or audio data to be transmitted. The CRC is a cyclic redundancy check known in the art.

In this example, it is desired to form a data communication path to transmit AES audio data from source group S9 across the network to the audio processors D3. The AES audio data is to be packetised by ENIC NI6, sent across the network and received and depacketised by ENIC NI10 before being delivered in serial digital format to the audio processors D3. The user may instigate the connection between audio source S9 and the audio processors by interacting with the GUI displayed by the switching and routing client 6.

To set up the communication paths between audio source group S9 and audio processors D3, the switching and routing client 6 sends a CNMCP switch request message to a predetermined port of the network manager 4 to initiate a change to the current configuration of virtual circuit-switched connections. The network manager 4 sends CNMCP messages to the switching and routing client 6 providing information on the source devices and destination devices (and the associated source groups and destination groups) that are available to it. This enables the switching and routing client 6 to derive a view specifying the current configuration and status of the network. Each source device and destination device has an associated ID assigned by the network manager in communications to the switching and routing client 6 and this device ID is used by the switching and routing client 6 in subsequent communications with the network manager. In response to a user request to connect S9 to D3 the switching and routing client 6 send a CNMCP message device to the network manager 4 containing the ID of the relevant source device and the ID of the destination.

In the event that the switching and routing client 6 is not permitted to perform this operation (e.g. if there is insufficient network bandwidth available to form a reliable connection)

then the network manager 4 sends a NACK (negative acknowledgement) CNMCP message to the switching and routing client 6 in response to the connection request. On the other hand, if the network manager 4 permits establishment of the connection, the connection request will be processed as follows.

First, the network manager 4 queries its network configuration database to determine which multicast IP address the AES audio data from source group S9 is currently being transmitted to. Then an AVSCP switch message containing the multicast IP address to which S9 transmits is created by the network manager 4 and sent to the relevant port (device) of the ENIC NI10, which connects the audio processors D3 to the network. Embedded software on the ENIC NI10 sends an IGMP join message to the multicast IP address on which the audio data of S9 is transmitted and then sends an AVSCP ACK message back to the network manager. This enables the ENIC NI10 to receive the output of the audio source S9 on one of its destination devices and the ENIC NI9 will route the received audio data to the source device (ENIC AES output port) that connects to the audio processors D3. Meanwhile, the network manager 4, having received the AVSCP ACK message from the ENIC NI10 acknowledging that the instruction to join the specified multicast IP address has been received, will update the routing information in the network configuration database to reflect the existence of the newly formed connection. Finally, the network manager 4 sends a CNMCP ACK message to the switching and routing client 6 indicating that the requested audio data connection between S9 and D3 has been successfully set up.

In this example of operation, two of the source groups of FIG. 1 are connected to a single destination group. In particular, the outputs of 'Camera 1' S1 and 'Camera 2' S2 are supplied as inputs to the video switch D8. To initiate connections between S1 and D8 and between S2 and D8, the switching and routing client 6 sends CNMCP switch messages to the network manager 4 containing the ID values associated with 'Camera 1' S1, 'Camera 2' S2 and the video switch D8.

Recall that the network configuration database of the network manager 4 also stores data in relation to each ENIC device category. In particular, the network configuration database stores data indicating whether each source device is linked, the number of video lines to delay transmission of the data stream by and the current transmission status the source device. The network manager 4 also derives information with regard to the destination devices from the database, including the IP address of the ENIC that implements the device and the number of video lines to delay playout by.

From the network configuration database the network manager 4 can determine the multicast. IP address that each of the camera source groups S1, S2 transmits data to. Thus to establish the connections between the two cameras S1, S2 and the video switch D8 the network manager 4 transmits AVSCP messages to the ENIC NI8 specifying both the multicast IP address onto which 'Camera 1' transmits AV data and the multicast IP address onto which 'Camera 2' transmits AV data. The AV packets output by each of the two cameras are received by the network processor 20 of the ENIC NI8. Each of the received video packets specifies, in its header data, a destination IP address and the multicast group for which that AV packet is destined is derived from the IP address. The ENIC NI8 determines from the multicast group, to which output port (source device) of the ENIC NI8, the depacketised AV data should be routed. As explained above the multicast group determines to which subset of destination devices in the network a data packet should be routed.

Accordingly, in addition to the AV data streams from 'Camera 1' and 'Camera 2', the video switch D8 also receives control data from the ENIC NI8. The control data is sent by the switching and routing client 6 (FIG. 1) as Unicast control data, which is received via the network in packetised form by the ENIC NI8. The Unicast control data has a header that identifies it as a control packet. The control data may instruct the video switcher D8 to switch its output from one of the AV streams to the other i.e. from 'Camera 1' to 'Camera 2'.

Figure 4:
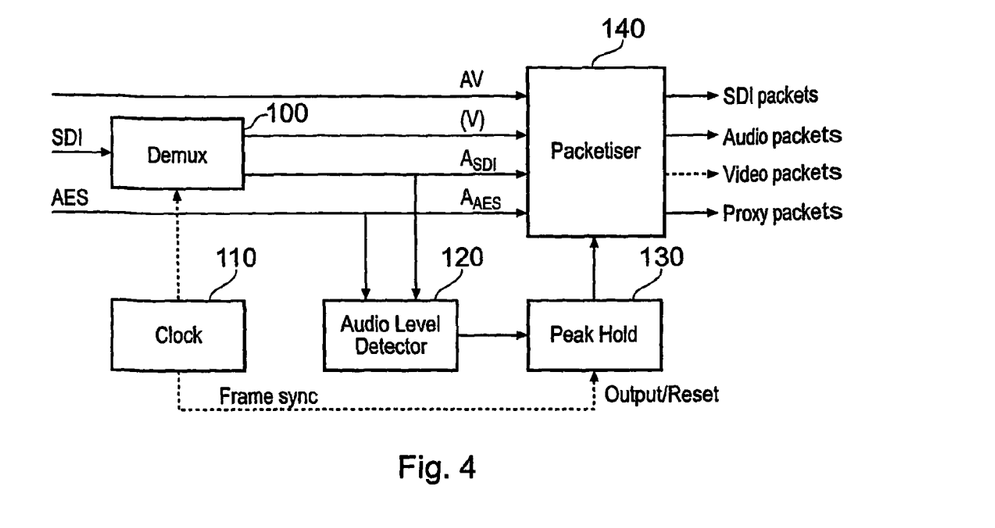
FIG. 4 schematically illustrates a part of the functionality of an ENIC.

FIG. 4 schematically illustrates part of the functionality of an ENIC. With regard to the functionality to be described, the ENIC comprises a demultiplexer 100, a clock generator, a level detector 120, a peak hold latch 130 and a packetiser 140. It will be appreciated, however, that the ENIC comprises other components not relevant to the present description and not shown in FIG. 4.

The demultiplexer 100 receives so-called SDI video according to the standard SMPTE 259M. It disassembles the SDI stream to remove the embedded audio data $A_{SDI}$ which is passed to the packetiser 140. Optionally, the demultiplexer 100 can produce a separate video stream V from the SDI stream, which is also passed to the packetiser 140.

The SDI stream itself is also passed to the packetiser 140 and a separate AES audio stream $A_{AES}$ is the fourth signal shown in FIG. 4 to be passed to the packetiser 140.

The level detector 120 acts to detect the audio level of the two audio streams $A_{SDI}$ and $A_{AES}$. For each audio stream, it can generate, for example, two separate level values (one for the left channel and one for the right channel) or a composite audio level, being dependent upon (for example) the average or peak value between the two channels. The detected audio levels in respect of the two audio streams $A_{SDI}$ and $A_{AES}$ are passed to the peak hold latch 130. This stores the peak value (in respect of each level signal) received since the latch was last re-set. A frame synchronisation pulse received from the clock generator 100 causes the currently stored peak value to be output by the peak hold latch 130 and also resets the peak hold latch so that it acquires a new peak value in respect of the following frame period. So, the peak hold latch 130 outputs peak audio level values, once per frame period, in respect of the peak level during the preceding frame period. The peak level values are passed to the packetiser 140.

Of course, other periods such as a field period or even a random or pseudo-random period may be used. A frame period is particularly useful as the data display at the received is generally updated at this rate.

The level detector could operate in other ways. For example, levels at certain frequency bands (e.g. 20-500 Hz; 500 Hz-2 kHz; above 2 kHz) could be detected and launched onto the network, so that at the receiver (see below) a graphic display could be generated showing the distribution of energy across the different bands can be shown, either per channel or averaged between the channels. Or a detection of changes in level could be generated. Or an indicator could be generated of whether the audio level over a number of frame periods is consistent or not. Of course, various combinations of these could be generated.

Another function, which is not shown in FIG. 4, is the generation of proxy video as described above.

The packetiser 130 produces packets representing the SDI stream, packets representing proxy data, including proxy video packets and level (attribute) data packets, audio packets which will be described further below and, optionally, video packets (i.e. the video component of the SDI stream without the audio component embedded). These packets are launched onto the network with appropriate multicast addresses as described above.

In a further alternative embodiment, the AES audio could be substituted into the SDI packets in place of the SDI audio.

One particular use of multiple audio streams is in a multi-language situation.

Figure 5:
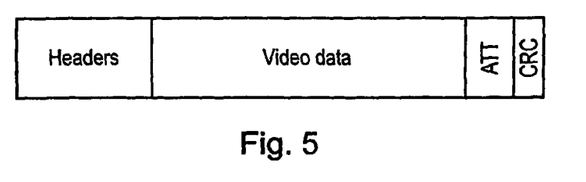
FIG. 5 schematically illustrates a video and attribute data packet.
Figure 6:
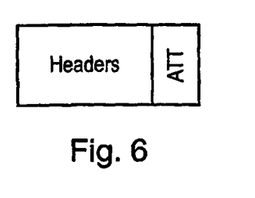
FIG. 6 schematically illustrates an attribute data packet.

FIGS. 5 and 6 schematically illustrate two possible ways in which the audio attribute data might be carried. In particular FIG. 5 schematically illustrates a video and attribute data packet, and FIG. 6 schematically illustrates an attribute data packet. In each case, various headers are provided similar to those shown in FIG. 3. In the case of FIG. 5, the headers are followed by video data which might be full bit rate video data or, more usefully, proxy (reduced bit rate) video data. The attribute data is then provided and finally a CRC code provides error protection. In the case of FIG. 6, the headers are simply followed by the attribute data for the current frame period and audio channel.

The packets carrying audio attribute data are associated with corresponding video or audio streams by (a) being part of a video packet; or (b) being broadcast to multicast groups which are noted by the client 6 and/or the network manager 4 to be associated with multicast groups of the corresponding video or audio streams. The multicast groups relating to attribute data are different to the groups carrying the corresponding audio signals.

It will be understood that by transmitting the attribute data separately, or by transmitting it as part of a video packet, the attribute data can be received separately from the full bandwidth audio data.

Figure 7:
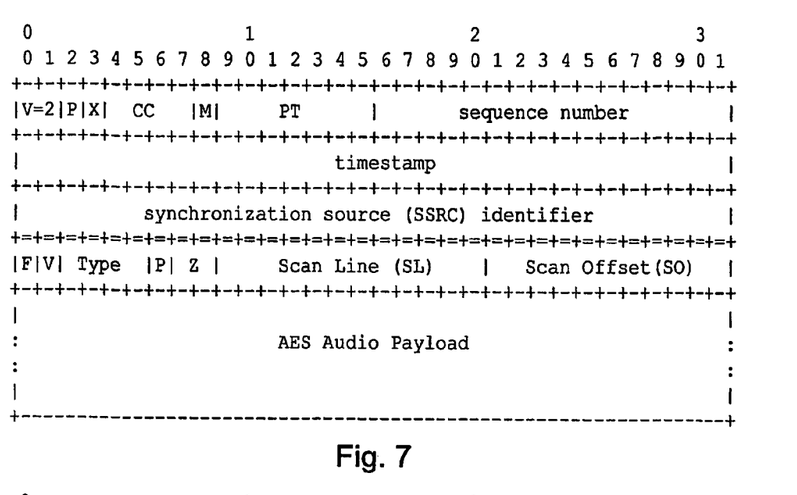
FIG. 7 schematically illustrates an RTP/BT.656 packet carrying AES audio.

FIG. 7 schematically illustrates an RTP/BT.656 packet carrying audio data derived from the $A_{AES}$ stream, the $A_{SDI}$ stream or both. The fields are as follows:

V RTP version number; current value is 2

P Padding bit: if set, the packet contains one or more additional padding bytes

X Extension bit: if set, the fixed header is followed by one header extension

CC The number of CSRC identifiers (see below)

M Marker bit: varying interpretation, but can be used to mark significant events such as frame boundaries PT Payload Type: identifies the AV format of the RTP payload The sequence number is incremented by one for each RTP packet sent, so the receiver can use it to detect packet loss and to restore the packet sequence. If RTP packets are generated periodically, the timestamp is set to the number of AV sampling clock ticks elapsed.

The synchronisation source (SSRC) identifier is a randomly chosen value meant to be globally unique within a particular RTP session. If a participant generates multiple streams in one RTP session, for example from separate video cameras, each must be identified as a different SSRC. The contributing source (CSRC) identifiers are present only in a mixed AV stream with multiple contributing sources.

The following fields form part of a BT.656 packet header which is appended as an extension field to the RTP packet header:

F F=0 signifies that the scan line belongs to the first field of a frame; F=1 signifies the second field.

V V=1 signifies that this scan line is part of vertical blanking

Type This represents the type of frame encoding within the payload. For example, in the PAL system, (13.5 MHz sample rate; 720 samples per line; 50 fields per second; 625 lines per frame) the type=1

P P indicates the required sample quantisation size. P=0 signifies that the payload comprises 8 bit samples. Otherwise, the samples are 10 bits. In the case of 10-bit video, the line length will exceed the maximum packet size allowed and so a line must be fragmented over two packets.

Z Reserved

The scan line may range from 1 to 625 inclusive. The scan offset field is used to allow fragmentation of scan lines over multiple packets. With reference to audio signals, the scan line signifies the ordering of the portion of the audio signal included in that packet.

The audio payload follows. The format of the audio payload will be described below.

Figure 8:
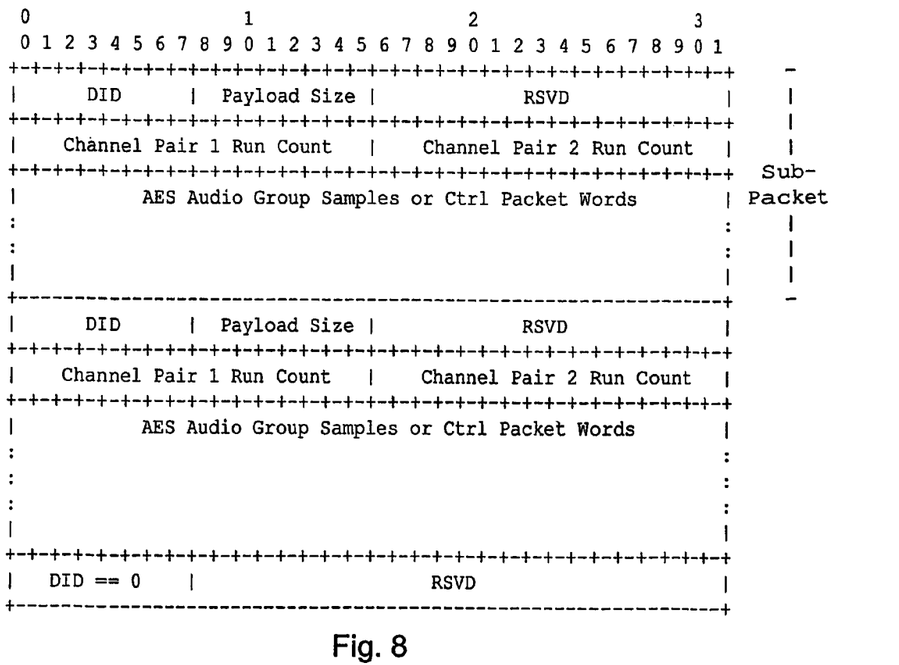
FIG. 8 schematically illustrates the AES audio payload sub-packet structure.

FIG. 8 schematically illustrates the AES audio payload sub-packet structure.

Each sub-packet starts with a 32 bit header consisting of the following fields:

DID (Data ID) Matches the Audio Data Packet, Extended Data Packet and Audio Control Packet DIDs found in serial digital (SDI) video. Audio Data Packet DIDs indicate that the sub-packet payload contains only Audio Data Packet data and no associated Extended Data Packet data exists for this packet. Extended Data Packet DIDs indicate that the sub-packet payload contains Audio Data Packet and its associated Extended Data Packet data. An Audio Control Packet DID indicates that the sub-packet payload contains Audio Control Packet data. A DID of $00_h$ indicates the end of audio payload. The table below summarises the use of DIDs.

| DIDs (Groups 1-4) | SMPTE 272M | Audio RTP |
|---|---|---|
| $FF_h, FD_h, FB_h, F9_h$ | Audio Data Packet | Audio Data Sub-Packet |
| $FE_h, FC_h, FA_h, F8_h$ | Extended Data Packet | Audio Data & Extended Data Sub-Packet |
| $EF_h, EE_h, ED_h, EC_h$ | Control Data Packet | Control Data Sub-Packet |
| $00_h$ | Undefined Format | End of Audio RTP payload |

Payload Size Indicates the size of the payload in 32 bit words.

Channel Pair 1 Run Count For Audio Data Sub-Packets or Audio Data & Extended Data Sub-Packets this is a rolling count of the total number of channel 1 pairs for the audio group indicated by the DID excluding those in the following payload. For Control Data Sub-Packets this is a rolling count of the total number of Control Data Sub-Packets for the group indicated by the DID.

Channel Pair 2 Run Count For Audio Data Sub-Packets or Audio Data & Extended Data Sub-Packets this is a rolling count of the total number of channel 2 pairs for the audio group indicated by the DID excluding those in the following payload. For Control Data Sub-Packets this unused and set to zero.

Figure 9:
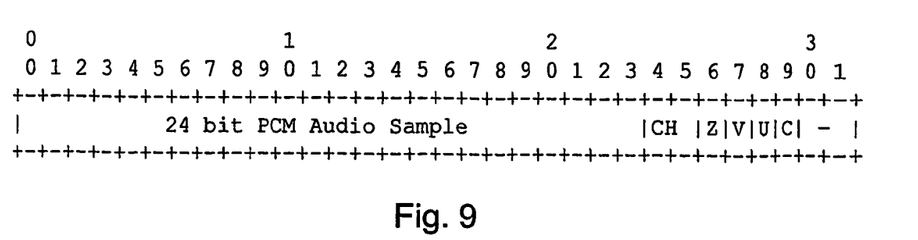
FIG. 9 schematically illustrates the format of an audio word.

FIG. 9 schematically illustrates the format of an audio word.

Since AES audio groups consist of 1 or 2 channel pairs (see SNPTE272M paragraph 3.9) the AES Audio Group Sub-Packet payload contains an even number of audio words. Each audio word is held in the 32-bit container shown in FIG. 9.

CH Identifies the audio channel within the audio group

Z Identifies the start of a channel status block

V AES sample validity bit

U AES user bit

C AES channel status bit

Figure 10:
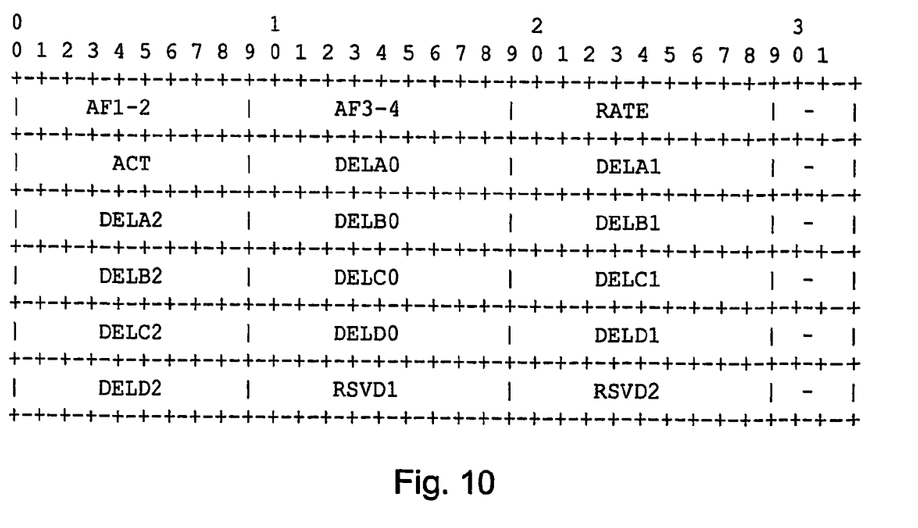
FIG. 10 schematically illustrates an AES audio control sub-packet payload structure.

An AES Audio Control Sub-Packet payload is formatted as shown schematically in FIG. 10. For a description of the contents of this payload see section 14 of SMPTE272M.

Figure 11:
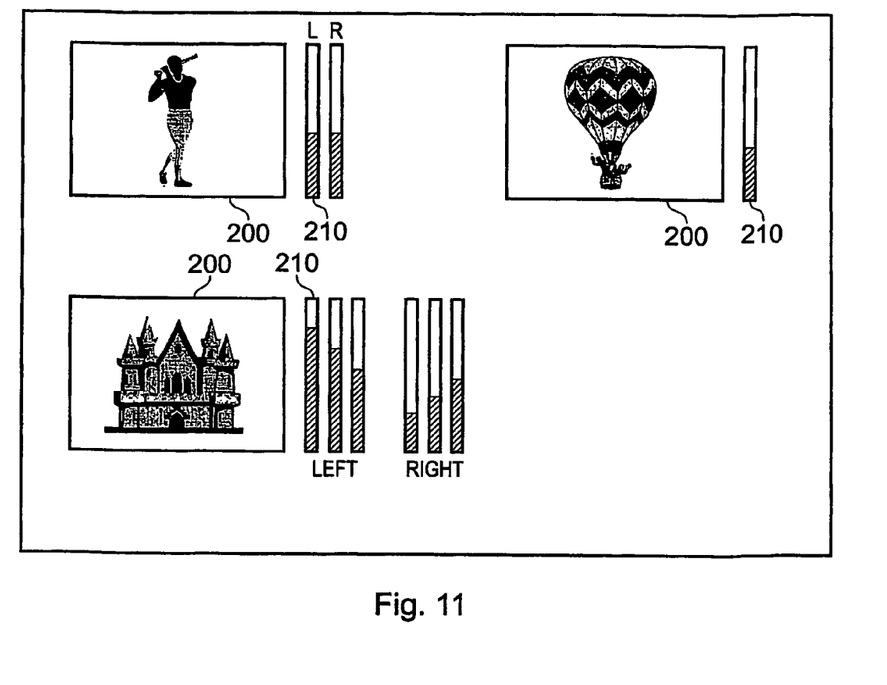
FIG. 11 schematically illustrates a part of a screen display.

FIG. 11 schematically illustrates part of a screen display, which may be seen, for example, on the GUI of the switching and routing client 6 or alternatively on a GUI provided by the signal monitor D10. In the example of FIG. 11, three video streams are displayed as tiled images 200. These may be representations of full band width (uncompressed) video, but are more likely to represent proxy video images. Alongside such image there is displayed a level indication 210 derived from received attribute data (which may be received without receiving the corresponding full bandwidth audio signal). This is updated for display once per frame period and provides a schematic illustration of the peak audio level during each frame period. So, when the user sees that the audio level is going up and down in a normal manner, the user can be reassured that a real audio signal is being handled in connection with that audio channel. The audio level indication may be in the form of a stereo pair, as shown schematically in the top left part of FIG. 11; or may be a single indication forming an average across the two stereo channels (or in respect of a mono channel) as shown in the top right of FIG. 11; or may be a graphic display of plural frequency bands per channel, as shown schematically in the bottom right of FIG. 11. The skilled man will appreciate that the form of the display can be selected to suit the form of the data produced by the level detector.

REFERENCES

1, RTP Payload Format for BT.656 Video Encoding, D. Tynan, (Claddagh Films) RFC2431, October 1998.

The invention claimed is:

1. A network interface device connectable to a network, the device being arranged to receive digital audio data representing an audio signal and to launch data packets representing the digital audio data onto the network, the device comprising:
   an audio amplitude level detector having a processor programmed to generate, from audio properties of the digital audio data, audio amplitude level data representing an audio amplitude level of the audio signal; and
   a packetiser operable:
   to format the digital audio data into audio data packets to be launched onto the network, and
   to format the audio amplitude level data into audio amplitude level data packets, separate from the audio data packets, to be launched onto the network so that the audio amplitude level data packets can be received by a destination device without the destination device receiving the audio data packets.

2. A device according to claim 1, being arranged to launch the audio data packets and the audio amplitude level data packets onto the network as separate respective multicast groups.

3. A device according to claim 1, in which the audio amplitude level detector is arranged to generate the audio amplitude level data representing the audio amplitude level at periodic intervals.

4. A device according to claim 1, in which:
   the digital audio data is associated with digital video data representing a video signal having a picture repetition period;
   the audio amplitude level detector is arranged to generate the audio amplitude level data at least once in each successive picture repetition period.

5. A device according to claim 4, in which the picture repetition period is a frame repetition period.

6. A device according to claim 4, in which the picture repetition period is a field repetition period.

7. A device according to claim 4, in which the digital video data is received by the device as part of a composite data stream carrying both the digital video data and the digital audio data.

8. A device according to claim 7, further comprising:
   a data converter for converting the digital audio data of the composite data stream into separate digital audio data to be launched onto the network as audio data packets,
   in which the packetiser is operable to format the digital video data into video data packets to be launched onto the network.

9. A device according to claim 7, in which the packetiser is operable to format the composite data stream into composite data packets to be launched onto the network.

10. A device according to claim 1, the device being operable to launch the audio packets onto the network substantially in real time.

11. A data network comprising: one or more network interface devices connectable to a network and arranged to receive digital audio data representing an audio signal and to launch data packets representing the digital audio data onto the network, each network interface device including: an audio amplitude level detector having a processor programmed to generate, from audio properties of the digital audio data, audio amplitude level data representing an audio amplitude level of the audio signal; and a packetiser operable: to format the digital audio data into audio data packets to be launched onto the network, and to format the audio amplitude level data into audio amplitude level data packets, separate from the audio data packets, to be launched onto the network so that the audio amplitude level data packets can be received by a destination device without the destination device receiving the audio data packets; and one or more network destination devices operable to
   (1) receive the audio data packets representing the audio signal launched onto the network and
   (2) receive the audio amplitude level data packets carrying audio amplitude level data representing the audio amplitude level of the audio signal launched onto the network without receiving the audio data packets, the one or more network destination devices comprising a user interface arranged to provide a user indication representing a current value of the audio amplitude level data, wherein the network provides data communication between the one or more network interface devices and the one or more network destination devices.

12. A network interface device connectable to a network and operable to receive a composite data stream carrying digital video data and digital audio data, the digital audio data representing an audio signal, the device comprising:
   a data converter for converting the digital audio data of the composite data stream into separate digital audio data;
   an audio amplitude level detector having a processor programmed to generate, from audio properties of the separate digital audio data, audio amplitude level data representing an audio amplitude level of the audio signal;
   a packetiser which is operable:
   to format at least the digital video data of the composite data stream into video data packets to be launched onto the network,
   to format the separate digital audio data into audio data packets to be launched onto the network, and
   to format the audio amplitude level data into audio amplitude level data packets, separate from the audio data packets, to be launched onto the network so that the audio amplitude level data packets can be received by a destination device without the destination device receiving the audio data packets.

13. A device according to claim 12, in which the packetiser is operable to format the composite data stream into composite data packets to be launched onto the network.

14. A device according to claim 12, arranged to receive an AES audio stream, the packetiser being operable to format the separate digital audio data and the AES audio stream into audio data packets to be launched onto the network.

15. A method of operation of a network interface device connectable to a network, the device being arranged to receive digital audio data representing an audio signal and, substantially in real time, to launch data packets representing the digital audio data onto the network, the method comprising:
  generating, using a processor, audio amplitude level data representing an audio amplitude level of the audio signal;
  formatting the digital audio data into audio data packets to be launched onto the network; and
  formatting the audio amplitude level data into audio amplitude level data packets, separate from the audio data packets, to be launched onto the network so that the audio amplitude level data packets can be received by a destination device without the destination device receiving the audio data packets.

16. A method of operation of network interface device connectable to a network and operable to receive a composite data stream carrying digital video data and digital audio data, the digital audio data representing an audio signal, the method comprising:
  converting the digital audio data of the composite data stream into separate digital audio data;
  formatting at least the digital video data of the composite data stream into video data packets to be launched onto the network;
  formatting the separate digital audio data into audio data packets to be launched onto the network;
  generating, using a processor, audio amplitude level data representing an audio amplitude level of the audio signal;
  formatting the audio amplitude level data into audio amplitude level data packets, separate from the audio data packets, to be launched onto the network so that the audio amplitude level data packets can be received by a destination device without the destination device receiving the audio data packets.

\* \* \* \* \*